United States Patent [19]

Mattes et al.

[11] Patent Number: 5,764,465
[45] Date of Patent: Jun. 9, 1998

[54] ELECTRONIC CIRCUIT ARRANGEMENT HAVING POLARITY REVERSAL PROTECTION

[75] Inventors: Bernhard Mattes; Ralf Henne, both of Sachsenheim; Bernd Säufferer, Schlierbach, all of Germany

[73] Assignee: Autoliv ASP, Inc., Ogden, Utah

[21] Appl. No.: 805,521

[22] Filed: Feb. 26, 1997

[30] Foreign Application Priority Data

Dec. 19, 1995 [DE] Germany .......... 195 47 358.2
Mar. 9, 1996 [DE] Germany .......... 196 09 219.1

[51] Int. Cl.$^6$ .......... H02H 3/00
[52] U.S. Cl. .......... 361/77; 361/82; 361/84
[58] Field of Search .......... 361/77, 82, 84, 361/58; 307/10.1, 10.7

[56] References Cited

U.S. PATENT DOCUMENTS 4,423,456  12/1983  Zaidenweber .......... 361/77

OTHER PUBLICATIONS

National Semiconductor Corp., "Voltage Regulator Handbook", 1981, pp. 7–39.

*Primary Examiner*—Jeffrey A. Gaffin
*Assistant Examiner*—Stephen Jackson

[57] ABSTRACT

A MOS field-effect transistor (T2) is provided in conjunction with transistors (T1 and T3) as polarity reversal protection in an electrical circuit arrangement (1). Polarity reversal protection of this type is realized by the drain-source path of the transistor (T2). Transistors (T1 and T3) form a comparator. If the drain-source voltage of the transistor (T2) becomes negative then the transistor (T3) switches on. This, in turn has the effect of switching off the transistor (T2) thereby providing polarity reversal protection. The electronic circuit arrangement (1) configured according to the invention can advantageously be used in an airbag system (10).

2 Claims, 1 Drawing Sheet

ELECTRONIC CIRCUIT ARRANGEMENT HAVING POLARITY REVERSAL PROTECTION

DESCRIPTION OF THE RELATED ART

It is known to use electronic components having a valve action, in particular semiconductor diodes, as polarity reversal protection in electronic circuits. See, for example, the company publication "Voltage Regulator Handbook 1982", pages 7–39, from National Semiconductor Corporation. The polarity reversal protection protects the electronic circuit from destruction in the event of polarity reversal of the supply voltage.

SUMMARY OF THE INVENTION

In addition to reliable polarity reversal protection, the solution according to the invention affords, in particular, the advantage of a small voltage drop across the component which is provided for the polarity reversal protection. This is particularly important in electronic circuits which have to be supplied with a small supply voltage. This is the case, for example, with an airbag system, which, when the battery is destroyed or torn away, has to be supplied with a limited amount of energy from a storage capacitor which is provided as a reserve energy source.

BRIEF DESCRIPTION OF THE DRAWINGS

An exemplary embodiment of the invention is explained in the following description and is illustrated in the drawing, in which.

DETAILED DESCRIPTION OF THE INVENTION

Figure 1:
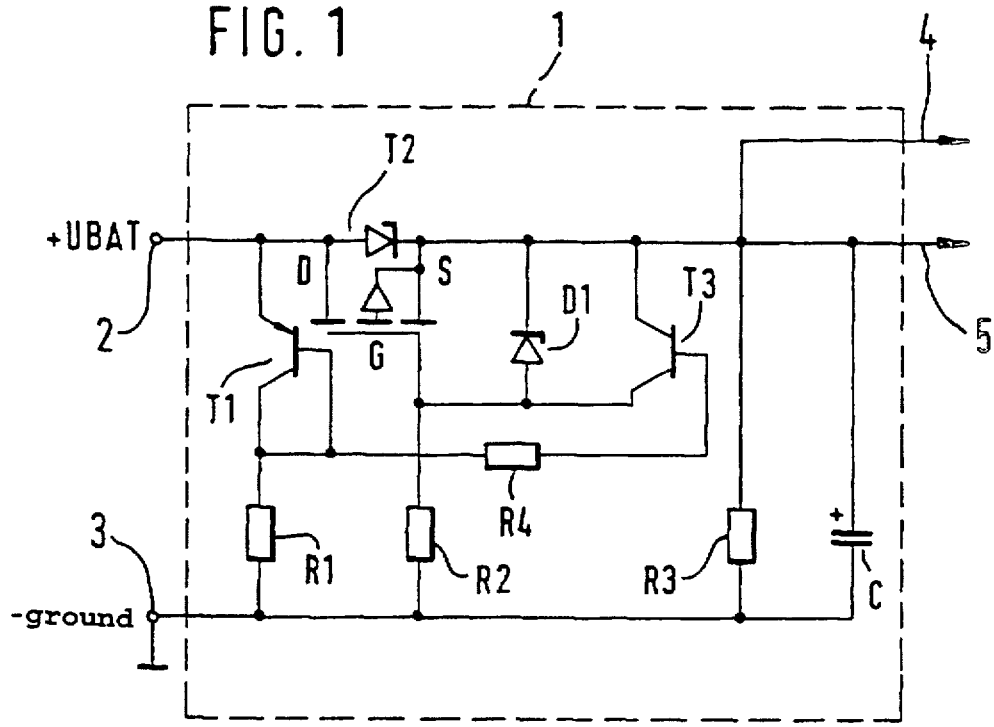
FIG. 1 shows a circuit diagram of the electronic circuit arrangement and FIG. 2 shows the application of the electronic circuit arrangement in an airbag system illustrated as a block diagram.

FIG. 1 shows the circuit diagram of an exemplary embodiment of the electronic circuit arrangement 1. The circuit arrangement 1 has two input terminals 2, 3, which are connected to the positive terminal +UBAT of the vehicle battery 14 (FIG. 2) and to the negative pole (−ground) of the vehicle battery, respectively. Connected to the input terminal 2 is the emitter terminal of a first transistor T1, the collector terminal of which is connected via a resistor R1 to the terminal 3. The base terminal of the transistor T1 is connected to its collector terminal. The drain terminal of an MOSFET transistor T2 is connected to the input terminal 2. The gate terminal of the transistor T2 is connected to ground via a resistor R2. The source terminal of the transistor T2 is connected to an output terminal 5 of the electronic circuit arrangement 1, which output terminal is connected to ground via a resistor R3. A capacitor C is connected in parallel with the resistor R3. One terminal of a resistor R4 is connected to the base terminal of the transistor T1. The second terminal of the resistor R4 is connected to the base terminal of a third transistor T3, the collector terminal of which is connected to the gate terminal of the transistor T2. The emitter terminal of the transistor T3 is connected to the source terminal of the transistor T2. A zener diode D1 is connected between the source terminal of the transistor T2 and the collector terminal of the transistor T3. The reference number 4 designates a second output terminal of the electronic circuit arrangement 1 which is connected in parallel with the output terminal 5.

In order to be able to operate a voltage regulator even in the event of a comparatively low input voltage at the input terminals 2, 3 of the circuit arrangement 1, the regulating voltage of which voltage regulator differs only slightly from the input voltage, only a very small voltage drop is permitted to be produced across the component which is provided for the polarity reversal protection. In accordance with the solution of the invention, polarity reversal protection of this type is realized by the drain-source path of the transistor T2. The P-channel MOSFET transistor T2 is in this case operated with drain-source terminals whose polarity has been reversed. The zener diode D1 protects the gate-source junction of the transistor T2 from overvoltages and clamps the gate-source voltage to a voltage value at the level of the complete turn-on voltage. The transistors T1 and T3 form a comparator. If the drain-source voltage of the transistor T2 becomes negative, for example in the event of a voltage dip, in the event of a short circuit to ground or in the event of polarity reversal of the voltage supply, then the transistor T3 switches on. This, in turn, has the effect of switching off the transistor T2. At the same time, the charge contained in C is essentially retained.

In an exemplary embodiment of the invention, it was possible reliably to operate a voltage regulator with an input voltage of just 6 volts, which voltage regulator provided a stabilized voltage of 5 volts. At the same time, with a current IDS of about 100 mA, a voltage drop UDS merely of about 50 mV was produced across the transistor T2, provided for the polarity reversal protection, of the electronic circuit arrangement 1.

Figure 2:
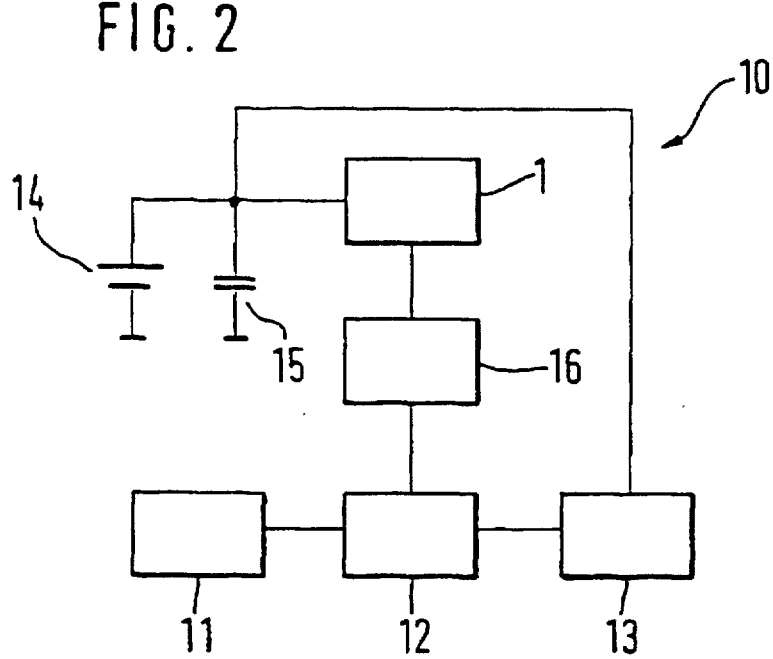

The electronic circuit arrangement 1 configured according to the invention can advantageously be used in an airbag system 10, which is illustrated as a block diagram in FIG. 2. The airbag system 10 comprises at least one acceleration-sensitive sensor 11 which is connected to a control unit 12. The control unit 12 is connected to at least one airbag 13. The airbag system 10 is normally supplied with energy from the battery 14 of the vehicle. Connected in parallel with the battery 14 is a capacitor 15, which serves as an energy reserve in the event that the battery is disconnected from the airbag system during an accident. The battery 14 is connected to the electronic circuit arrangement 1 which serves for the polarity reversal protection and is connected on the output side to a voltage regulator 16.

The sensor 11 supplies output signals which correspond to the acceleration of the vehicle and are evaluated by the control unit 12. In the event of danger to the vehicle occupant, the control unit 12 drives the airbag 13, which opens out in order to protect the vehicle occupant. If the battery is disconnected from the airbag system, the airbag system can only be supplied with energy by the previously charged capacitor 15. The small voltage drop, which can be achieved by means of the invention, in the electronic circuit arrangement 1 provided for the polarity reversal protection ensures that the voltage regulator 16 which follows in the circuit diagram is supplied with the highest possible input voltage.

What is claimed is:

1. An electronic circuit arrangement having polarity reversal protection wherein an MOS field-effect transistor (T2) is provided for the polarity reversal protection, the drain terminal of which transistor is connected to the positive input terminal (2) of the circuit arrangement, the source terminal of which transistor is connected to the positive output terminal of the circuit arrangement (1) and the gate terminal of which transistor is connected to the ground terminal wherein two transistors (T1, T3 ) which form a comparator are provided, the emitter terminal of the transistor (T1) being connected to the drain terminal of the transistor (T2), the emitter terminal of the transistor (T3) being connected to the source terminal of the transistor (T2), the collector terminal of the transistor (T1) being connected via a resistor (R1) to ground, the collector terminal of the transistor (T3) being connected to the gate terminal of the transistor (T2) and, via a resistor (R2), to ground, and finally, the base terminal of the transistor (T3) being connected via a resistor (R4) to the base terminal of the transistor (T1) and to the collector terminal thereof.

2. The circuit arrangement of claim 1, which is used in an airbag system (10).

* * * * *